No. 867,803. PATENTED OCT. 8, 1907.
V. CROIZAT.
HEAT TRANSFERRING APPARATUS.
APPLICATION FILED MAR. 13, 1906.

WITNESSES
A. Worden Gibbs
C. E. Trainor

INVENTOR
Vittorio Croizat
BY Munn & Co.
ATTORNEYS

UNITED STATES PATENT OFFICE.

VITTORIO CROIZAT, OF TURIN, ITALY.

HEAT-TRANSFERRING APPARATUS.

No. 867,803.         Specification of Letters Patent.         Patented Oct. 8, 1907.

Application filed March 13, 1906. Serial No. 305,907.

*To all whom it may concern:*

Be it known that I, VITTORIO CROIZAT, engineer, residing at Turin, Italy, Via Gioberti 11, a subject of the King of Italy, have invented certain new and useful Improvements in Heat - Transferring Apparatus, of which the following is a full, clear, and exact specification.

Figure 1:
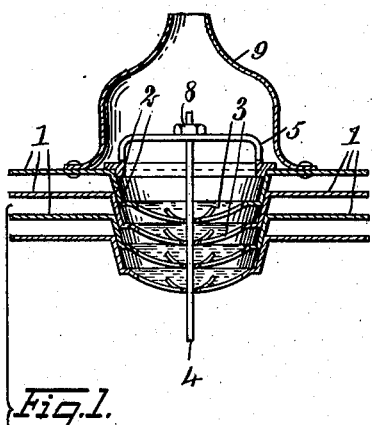
Figure 2:
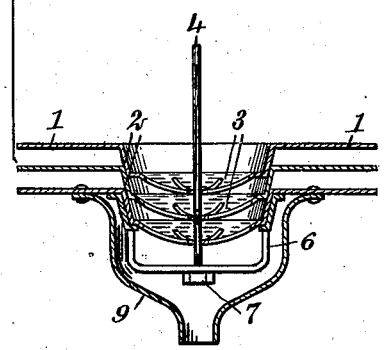
Figure 3:
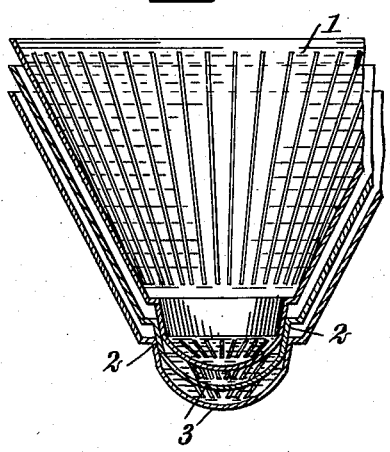
Figure 4:
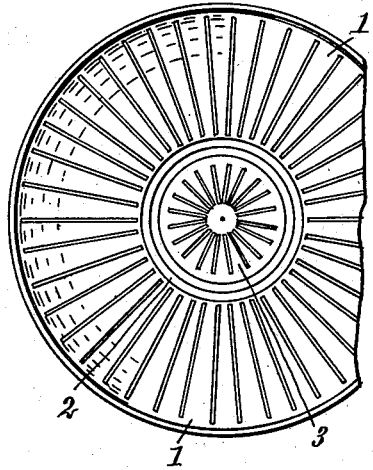

The invention has for its object to provide means for rendering rapid and complete the transmission of heat from one fluid, to another fluid, and is illustrated in the annexed drawings wherein Figure 1 and Fig. 2 show respectively a longitudinal section and a top view of one form of construction, and Figs. 3 and 4 show respectively a longitudinal section and a top view of another form of construction.

1 is an elementary plate having a central projecting portion in the form of a truncated cone the bottom 3 of which is provided with perforations.

By placing one above the other a number of elementary plates 1 and pressing them together, the central projecting portions enter one into the other, forming a pipe which is delimited by the lateral surfaces 2 of the cones that come in close contact one with the other.

By making a liquid pass through said pipe the heat is rapidly carried from the same to the outside gas or atmosphere, or vice versa, by the conductivity and the large surface of the plates 1 and bottoms 3 which are in a single piece with them.

To give steadiness to the pipe it is convenient to have a bar 4 going through its axis and provided at its ends respectively with a head 7 and screw nut 8 pressing against cross pieces 5, 6, bearing against the extreme elements of the pipe.

The outer portions of plates 1 may be flat (Figs. 1, 2) or conical (Figs. 3, 4) or otherwise shaped in any convenient manner.

For joining several pipes one to the other, or to pipes of any other shape, connecting portions 9 may be fixed to the extreme elements of the pipe above cross-pieces 5, 6, so that joints can afterward be effected by any known means.

The surfaces 2 adhere very closely one to the other so as to be perfectly water and gas tight without any soldering.

The plates can be made of any convenient metal such as aluminium, copper, brass, etc.

The invention can be applied to refrigerators (radiators) for automobiles, to stoves for baths, and in all cases where it is desired to transmit heat from gases to liquids or vice versa.

What I claim is:

An apparatus of the class described, comprising a series of elements each consisting of a plate having at its central portion a frusto-conical depressed portion, provided with a perforated bottom, the depressed portion of each element being equal in diameter to the depressed portions of the other elements, said plates being arranged in parallelism with the depressed portion of each fitting into the depressed portion of the preceding plate to form a conduit, an annular member provided with a cross bar at each end of the series, a bolt traversing the depressed portions and the cross bars, a nut threaded on to the end of the bolt for securing the parts together, and tubular connections connected to the outermost elements of the series and communicating with said conduit.

In witness whereof, I have hereunto signed my name in the presence of two subscribing witnesses.

VITTORIO CROIZAT.

Witnesses:
 MARIO CAPUCCIO,
 GOTTARDO C. PIRONI.